UNITED STATES PATENT OFFICE.

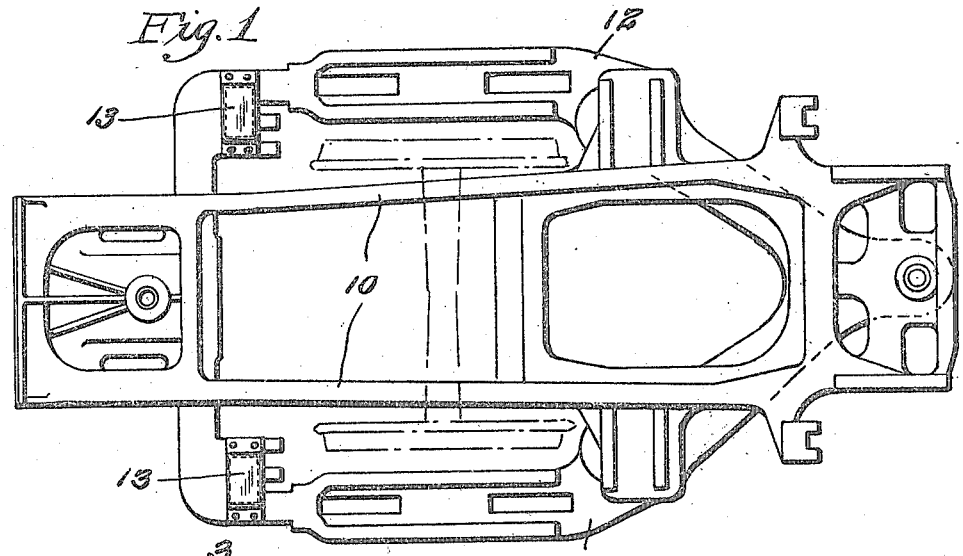
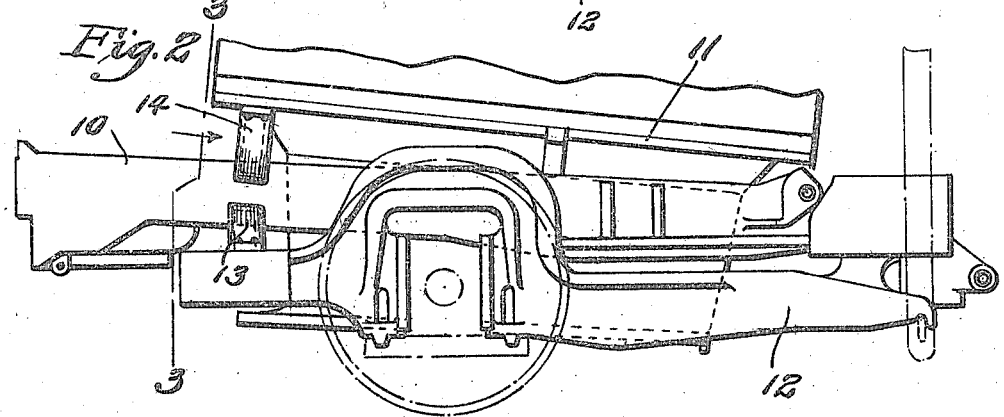
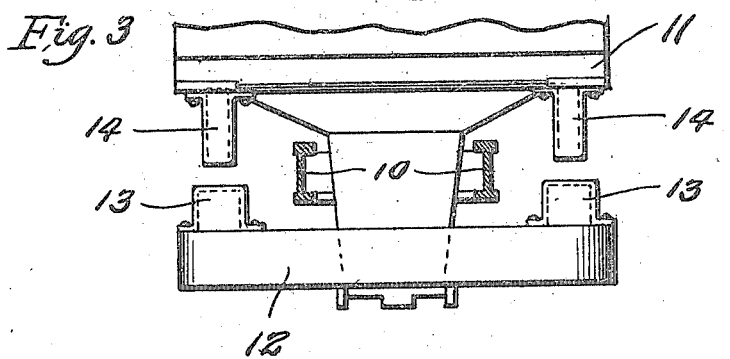

PERSIFOR F. SMITH, JR., OF PITTSBURGH, PENNSYLVANIA.

LOCOMOTIVE CRADLE AND TRAILER-TRUCK.

1,257,941.

Specification of Letters Patent.

Patented Feb. 26, 1918.

Application filed June 20, 1917. Serial No. 175,878.

*To all whom it may concern:*

Be it known that I, PERSIFOR F. SMITH, Jr., a citizen of the United States, residing at Pittsburgh, Pennsylvania, have invented a certain new and useful Improvement in Locomotive Cradles and Trailer-Trucks, of which the following is a full, clear, and exact description, such as will enable others skilled in the art to which it appertains to make and use the same, reference being had to the accompanying drawings, forming part of this specification.

My invention relates generally to railway locomotives and more particularly to the frame or cradle and the trailer truck thereof, the principal object of my invention being to provide simple means, preferably on the locomotive frame or cradle and the trailer truck frame for preventing the forward portion of the trailer truck frame and parts associated therewith from dropping onto the track in the event that said frame or parts become broken or detached from the locomotive frame.

It will be understood that the forward ends of the trailer truck frames of locomotives are pivotally or flexibly connected to the locomotive frame or cradle and in the event of breakage of the forward portion of said truck frame or of the parts connecting the same to the locomotive frame, the forward portion of said truck frame will drop onto the track, thereby causing damage and a possible wreck.

To overcome and eliminate these dangerous possibilities, I propose to arrange brackets or bearing blocks on the rear portion of the trailer truck frame and on the locomotive frame or cradle, which brackets or blocks permit the parts to which they are attached to move vertically with respect to each other during ordinary service, but in the event of breakage of the forward portion of the truck frame, the rear portion thereof will swing upward, with the result that the pairs of brackets or blocks will come in contact with each other, thereby preventing the forward portion of the trailer truck frame from dropping to a position where it will cause damage or a wreck.

With the foregoing and other objects in view, my invention consists in certain novel features of construction and arrangement of parts, hereinafter more fully described and claimed, and illustrated in the accompanying drawings, in which—

Figure 1 is a plan view of a portion of the locomotive frame and the trailer truck frame associated therewith, said trailer truck frame being equipped on its rear portion with the brackets or bearing blocks contemplated by my invention;

Fig. 2 is a side elevational view of a portion of the locomotive frame or cradle and the trailer truck frame associated therewith, and said parts being equipped with the brackets or bearing blocks;

Fig. 3 is a vertical section taken approximately on the line 3—3 of Fig. 2.

Referring by numerals to the accompanying drawings, 10 designates the usual locomotive cradle, 11 a part of the locomotive frame, and 12 the trailer truck frame, the forward end of which is pivotally or flexibly connected to the frame or cradle 10.

Located on the rear portion of the trailer truck frame and preferably at the sides thereof are upwardly projecting brackets or bearing blocks 13, the top surfaces of which are preferably flat. These brackets or bearing blocks may be cast integral with the trailer truck frame, or as illustrated in the accompanying drawings, they may be separately formed and secured to the frame by rivets, bolts or in any suitable manner.

Formed integral with or fixed to suitable parts of the locomotive frame or cradle, and normally positioned immediately above the brackets or blocks 13 are corresponding brackets or bearing blocks 14.

Under normal conditions, the space between the adjacent faces of these pairs of brackets or bearing blocks is greater than the vertical movement permitted by the truck springs so that in normal service the springs will have ample play and the trailer truck frame and locomotive frame can move vertically with respect to each other without bringing the adjacent faces of said brackets or bearing blocks in contact with each other.

In the event of breakage of the forward part of the truck frame or of the part to which it is attached and a tendency of said parts to drop onto the track, the rear portion of the truck frame will swing upward until the adjacent faces of the pairs of lugs 13 and 14 come in contact with each other, and thus the forward portion of the truck frame and the parts to which it is connected will be prevented from dropping onto the truck with resulting damage and a possible wreck.

The construction contemplated by my invention is comparatively simple, and provides effective means for preventing the forward portion of a trailer truck frame and the parts supported thereby from falling onto the track in the event that said truck frame or its connections become broken.

It will be readily understood that minor changes in the size, form and construction of the various parts of my improved locomotive cradle and truck frame can be made and substituted for those herein shown and described, without departing from the spirit of my invention, the scope of which is set forth in the appended claims.

I claim:

1. The combination with a locomotive frame and trailer truck frame, of stop members carried by and interposed between the rear portion of the trailer truck frame and parts of the locomotive frame for limiting the upward swinging movement of said truck frame.

2. The combination with a locomotive frame and trailer truck frame, of coöperating stop members arranged on the rear portion of the trailer truck frame and upon parts of the locomotive frame, which stop members limit the upward swinging movement of the rear portion of the trailer truck frame.

3. The combination with a trailer truck frame, of stop members projecting upwardly from the rear portion of said frame and adapted to engage parts carried by the locomotive frame to limit the upward swinging movement of the rear portion of said trailer truck frame.

4. The combination with a locomotive frame and trailer truck frame, of stop members depending from the locomotive frame, stop members on the rear portion of the trailer truck frame, said stop members being normally spaced apart and adapted to limit the upward swinging movement of the rear portion of the trailer truck frame.

5. The combination with a locomotive frame and trailer truck frame, of stop members depending from a portion of the locomotive frame to the rear of the trailer truck axle and adapted to engage parts carried by the trailer truck frame to limit abnormal upward swinging movement of the rear portion of the trailer truck frame.

In testimony whereof I hereunto affix my signature in the presence of two witnesses, this 11th day of June, 1917.

PERSIFOR F. SMITH, Jr.

Witnesses:
 ROBERT REILLY,
 W. S. CAREY.

Copies of this patent may be obtained for five cents each, by addressing the "Commissioner of Patents, Washington, D. C."